United States Patent [19]

Takenaka

[11] Patent Number: 5,331,142
[45] Date of Patent: Jul. 19, 1994

[54] SCAN VELOCITY DETECTOR AND CODE READER USING THE SAME

[75] Inventor: Shinya Takenaka, Osaka, Japan

[73] Assignee: Sumitomo Electric Industries, Ltd., Osaka, Japan

[21] Appl. No.: 826,378

[22] Filed: Jan. 27, 1992

[30] Foreign Application Priority Data

Jan. 31, 1991 [JP] Japan .................................. 3-11131

[51] Int. Cl.$^5$ .............................................. G06K 7/10
[52] U.S. Cl. ..................................... 235/466; 235/463
[58] Field of Search ........................ 235/466, 462, 463

[56] References Cited

U.S. PATENT DOCUMENTS

| | | | |
|---|---|---|---|
| 3,751,636 | 8/1973 | Coles, Jr. ............................ | 235/466 |
| 3,752,963 | 8/1973 | Herrin ................................. | 235/466 |
| 4,219,152 | 8/1980 | Couch et al. . | |
| 4,673,811 | 6/1987 | Looschen . | |

FOREIGN PATENT DOCUMENTS 0240767 10/1987 European Pat. Off. .
0400969 12/1990 European Pat. Off. .

OTHER PUBLICATIONS

Penny, "Dynamic Threshold Setting Circuit", IBM Technical Disclosure Bulletin, vol. 18, No. 6, Nov. 1975, New York, pp. 1962-1965.

*Primary Examiner*—Samuel A. Turner
*Assistant Examiner*—Karl D. Frech
*Attorney, Agent, or Firm*—Cushman, Darby & Cushman

[57] ABSTRACT

A scan velocity detector for detecting scan velocity when a surface of an object is scanned with a beam of light generated by a light-projecting element; the scan velocity detector comprising light-receiving element to receive light which is reflected, threshold-level setting element for setting threshold levels, delay element for delaying the output of the light-receiving element and counting element for counting the time from when the output of the delay element exceeds a certain threshold level until it reaches a different threshold level; the scan velocity detector being an integral part of a bar code scanner, or similar device.

9 Claims, 5 Drawing Sheets

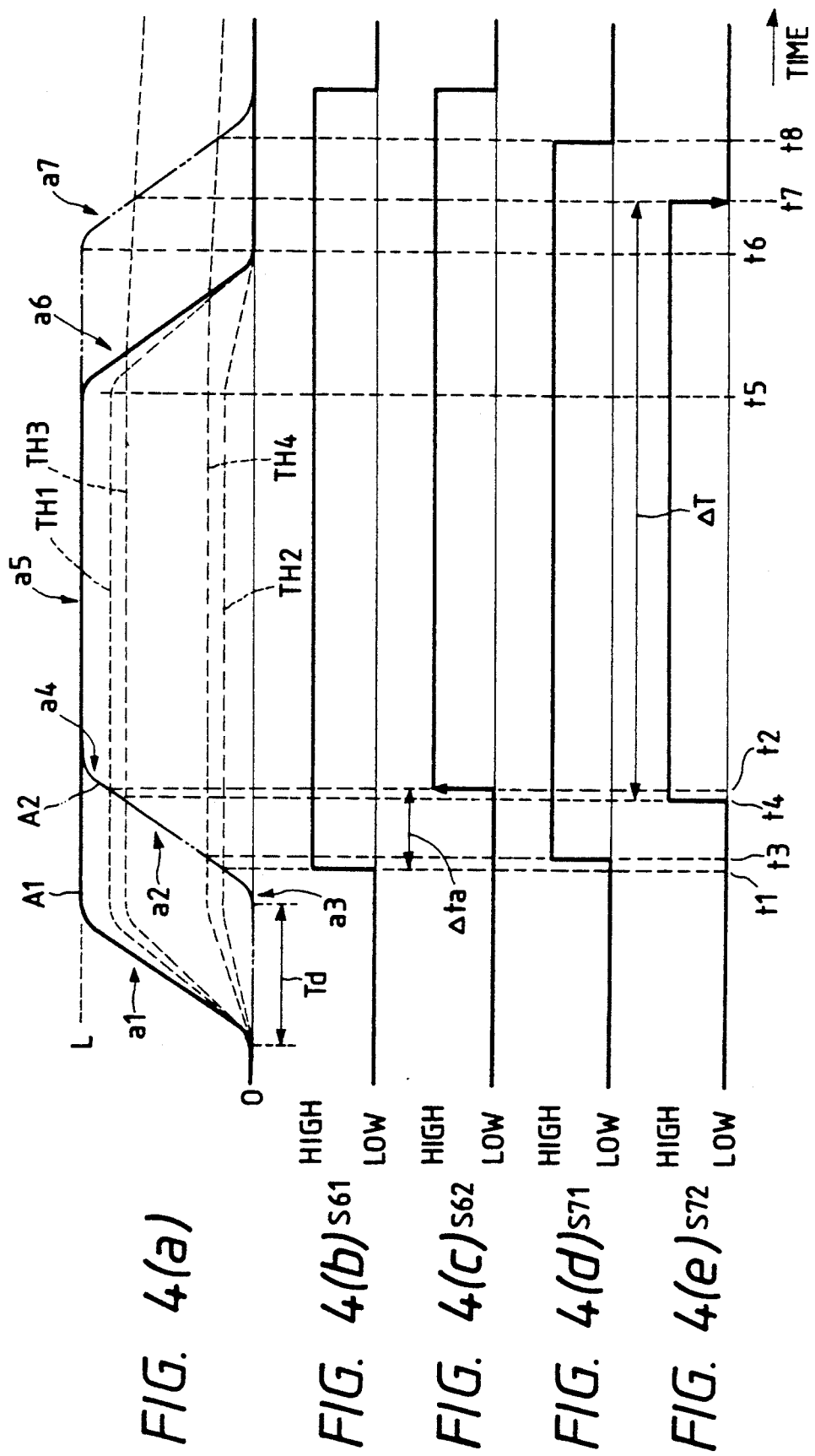

SCAN VELOCITY DETECTOR AND CODE READER USING THE SAME

BACKGROUND OF THE INVENTION

1. Field of the Invention

The present invention relates to a scan velocity detector for detecting the velocity at which a bar code bearing surface is scanned by a beam of light. In addition, the present invention concerns a bar code reader using the scan velocity detector.

2. Description of the Related Art

Conventionally, code readers adapted to scan codes have been used extensively with laser beams. Such code readers detect the light reflected from the code surface during scanning by a light-receiving element, such as a photodiode, so as to optically read the code. A bar code formed on a code surface, such as the surface of a package of a commodity, is an example of a type of code that is scanned in such a manner. The laser has an advantage over other light sources, such as the light-emitting diode, when used in a code reader. A narrowly collimated beam of light can be maintained over a long distance with the laser since the laser has remarkably outstanding focusing characteristics. Since resolution in code reading is determined by the size of a beam spot on the code surface, if a laser beam whose beam diameter can be narrowly collimated over a long distance is used, the range of a distance (reading range) for which reading is possible is expanded. For instance, a bar code scanner using a laser light source can read a bar code when the code surface and the device are spaced apart several dozens of centimeters. However, with a so-called pen-type scanner using a light emitting diode as a light source, reading cannot be effective unless the tip of the pen is brought into contact with the code surface.

Code readers using a laser beam include a manual scanning type shown in FIG. 6 in which the scanning of the code surface with the laser beam is effected manually and an automatic scanning type shown in FIG. 7 in which the scanning of the code surface with the laser beam is effected automatically.

For example, in the case of the manual scanning code reader shown in FIG. 6, a semiconductor laser light source 2, a lens 4 for generating a laser beam 3 by focusing the laser light generated from the semiconductor laser light source 2, and the like are accommodated in a casing 1. This casing 1 is a type which can be held in a hand 5, such as a pistol type. The casing 1 is held in a hand 5 of an operator. As the operator sweeps the casing 1 horizontally along a scan direction 8 of a bar code 7 formed on a code surface 6 with the joint of the wrist as a pivot point, for instance, the scanning of the bar code 7 is accomplished. The light reflected from the code surface 6 is received by an unillustrated light-receiving element disposed in the casing 1, and the discrimination of the bar code 7 is effected on the basis of an output of the light-receiving element.

In addition, in the case of the automatic scanning code reader in FIG. 7, a semiconductor laser light source 12; a collimator lens 13, for collimating the laser light generated from the semiconductor laser light source 12 into collimated light; a polygon mirror 17, for causing laser light 14 from the collimator lens 13 to scan a bar code 16 formed on a code surface 15; and the like are accommodated in a casing 11. This casing 11 is a type which can be held in a hand 19, such as a pistol type. The polygon mirror 17 is arranged such that the side surfaces of a regular polygon are formed as polarizing reflecting mirrors. The polygon mirror 17 is rotatively driven about its axis by an unillustrated motor. Since the direction of emergence of the laser light 14 from the casing 11 changes with time as the polygon mirror 17 rotates, the position of a beam spot on the code surface 15 thereby moves at a substantially fixed speed in the direction of arrow 18. Thus, the scanning of the bar code 16 is accomplished automatically. The laser light from the collimator lens 13 is made incident upon consecutively different polarizing reflecting surfaces as the polygon mirror 17 rotates, so that the bar code 16 is scanned repeatedly. Accordingly, by simply holding the casing 11 with a hand 19 and aiming at the bar code 16, the scanning of the bar code 16 is attained, and as the light reflected from the code surface 15 is received by the unillustrated light-receiving element in the casing 11, the reading of the bar code 16 is effected.

It is stipulated in JIS (Japanese Industrial Standards) and other bar code standards that a clear area having a certain minimum width should be provided at each opposite end of the bar code to ensure the reliability of the bar code reading. Various objects can be present in the vicinity of the bar code to be read or a surface pattern can be present on the commodity provided with the bar code. If these are scanned with the laser beam and the amount of reflected light received by the light-receiving element shows a fixed change, the objects other than the bar code can be erroneously recognized as being bar codes. If the clear area at the leading end of the bar code is detected and the bar code is discriminated on the basis of an output of the light-receiving element corresponding to an area following the clear area, it is possible to effect discrimination processing by extracting only a portion corresponding to the bar code from among the output signals of the light-receiving element.

The above-described detection of the clear area is generally effected during scanning with the laser beam by detecting that the output of the light-receiving element is not less than a fixed value and at least a predetermined time in duration. That is, a time t required for scanning the possible clear area is determined and when the time t is at least a predetermined value then the area is a clear area.

From the width d of the clear area in the scan direction and the travel velocity V of a beam spot on the code surface (hereinafter referred to as the "scan velocity"), a time tc required for scanning the clear area can be calculated using the following formula:

$$tc = d/V \tag{1}$$

However, the scan velocity V is not a fixed value in the case of manual scanning or in the case of automatic scanning. Scan velocity V in the case of automatic scanning is proportional to the optical path length (read distance) of the laser beam; i.e., the distance from the light source to the code surface. With the automatic scanning code reader as is shown in FIG. 7, there is a 10-fold difference in the scan velocity V when the code surface 15 is placed at a position 5 cm from the axis of rotation of the polygon mirror 17 from when the code surface 15 is placed at a position 50 cm from the axis of rotation of the polygon mirror 17. This is because the polygon mirror 17 rotates at a fixed angular velocity. Accordingly, even if the aforementioned time t is determined and this time t is compared with a fixed value, the detection of the clear area having the fixed width d cannot necessarily be conducted satisfactorily.

If the scan velocity V can be detected, the aforementioned problem can be solved by correspondingly changing the criteria of the time t. To date, however, there has been no apparatus which has realized the detection of the scan velocity V. For this reasons, the clear area has hitherto been detected by allowing for a large margin of clear area scanning times. The probability of detection of the clear area has been poor due to the large margin. The present situation is such that it cannot be ascertained whether the detected object represents a bar code or a signal other than the bar code until the bar code discrimination processing is actually conducted. This results in the need for the clear area to be detected again. Since the bar code discrimination processing is complicated and time consuming there are many cases where the scanning position of the laser beam has already passed the clear area and the bar code area during the time of processing. In such a case, the read opening has to be carried out again. This complicates the read operation.

To avoid this drawback, it is conceivable to store all the signals of one scanning in a memory and read the signals sequentially from the memory so as to effect the detection processing of the clear area. This, however, would require a large-capacity memory as well as a complicated memory-processing circuit for processing write/read operations with respect to the memory. Hence, new problems would arise in that the circuit would become large in size,, more complicated, and more costly.

SUMMARY OF THE INVENTION

Accordingly, an object of the present invention is to provide a scan velocity detector capable of overcoming the above-described technical problems and detecting the velocity at which an object to be scanned by a beam of light is scanned. This scan velocity detector is used for detecting scan velocity when a surface of an object to be scanned is scanned with a beam of light generated by light-projecting means, and comprises:

light receiving means for receiving light reflected from the surface of the object to be scanned and for converting the same into an electrical signal;

threshold-level setting means for setting a first threshold level TH1 using an output signal from the light-receiving means as a reference and for setting a second threshold level TH2 relatively lower than the first threshold level TH1;

delay means for delaying the output signal from the light-receiving means by a predetermined delay time; and counting means for counting the time duration from when an output signal from the delay means exceeds the second threshold level TH2 until the output signal of the delay means reaches the first threshold level TH1.

Another object of the present invention is to provide a code reader capable of ensuring the reliable reading of codes with an inexpensive arrangement and without causing circuitry to become too large in size and too complicated.

BRIEF DESCRIPTION OF THE DRAWINGS

FIGS. 4a–e is a timing chart explaining the operation of the configuration shown in FIG. 2;

DETAILED DESCRIPTION OF THE PREFERRED EMBODIMENTS

Figure 1:
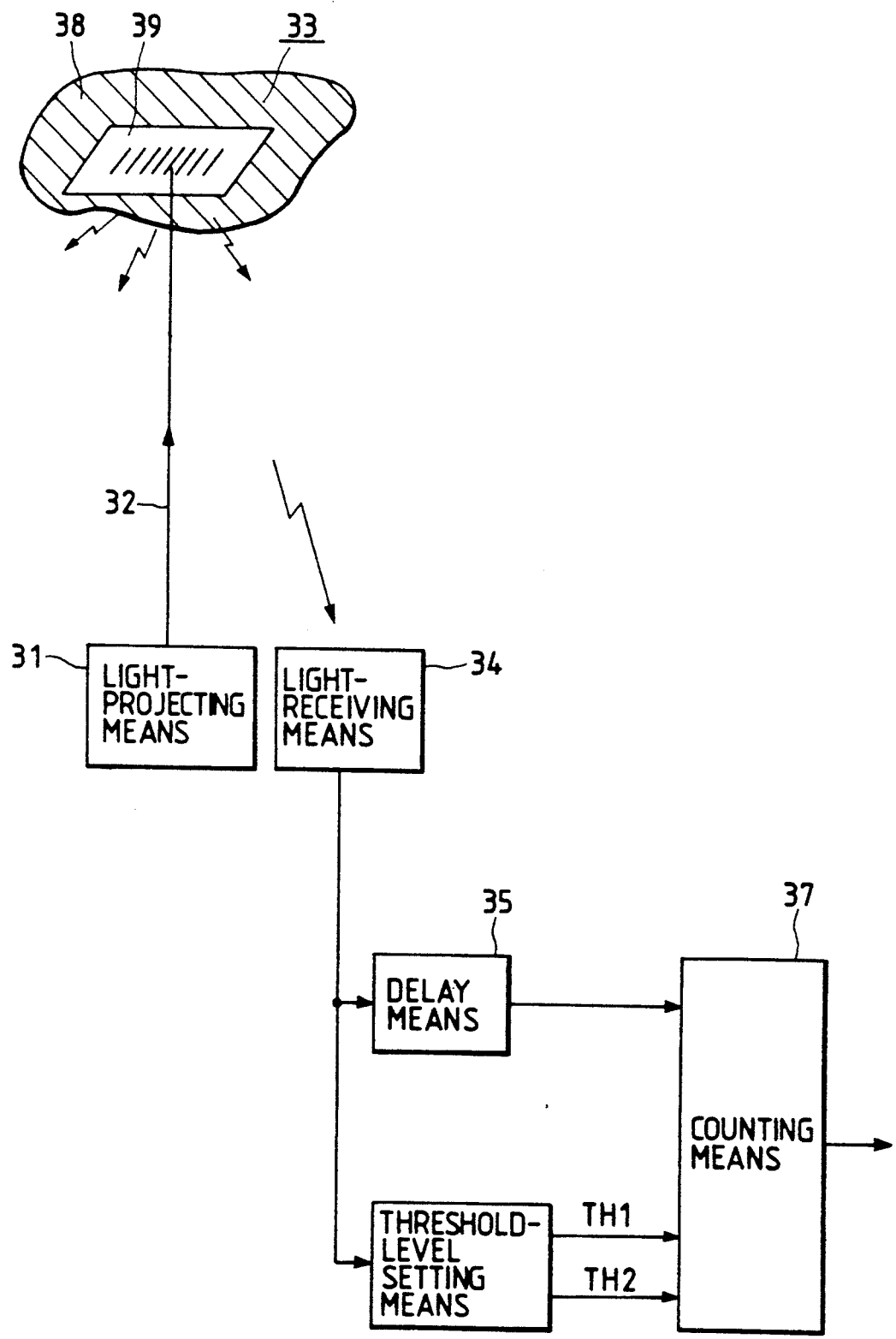
FIG. 1 is a block diagram illustrating a basic configuration of a scan velocity detector in accordance with the present invention.

FIG. 1 is a block diagram illustrating a basic configuration of a scan velocity detector in accordance with the present invention.

The scanning of the object 33 to be scanned with the beam of light 32 may be effected manually in such a manner that a casing accommodating the light-projecting means 31 and the like is held by a hand and is moved, or may be effected automatically by using a scanning mirror such as a polygon mirror or a galvanometer mirror.

In the scan velocity detector shown in FIG. 1, the threshold-level setting means 36 functions as a first level setting means and a second level setting means. However, the threshold levels TH1 and TH2 may be generated by separate arrangements.

The delay time of the delay means 35 is preferably selected to be a maximum value or longer than the duration from when the output from the light-receiving means 34 begins to rise until the output from the light-receiving means 34 reaches a stable level.

In addition, the threshold-level generating means 36 generates the first and second threshold levels TH1 and TH2 on the basis of the output signal from the light-receiving means 34. The first threshold level TH1, for instance, can be generated by dividing the potential of the output signal from the light-receiving means 34.

It should be noted that the second threshold level TH2 may be a variable level produced by, for instance, dividing the potential of the output signal from the light-receiving means 34, or may be a fixed level independent from the output signal of the light-receiving mean 34. This fixed level is preferably a value close to the 0 level of the output signal from the delay means 35.

The above-described scan velocity detector may be applied to a code reader for reading a code such as a bar code. The output signal from the aforementioned counting means 37 may be used to extract a signal corresponding to the code that is scanned from among the output signals of the light-receiving means 34 during the scanning, or may be used for discrimination processing of a code.

In addition, in a code reader for reading a bar code, it suffices if the following are provided:

third level setting means for setting a third threshold level;

second counting means for counting the length of a time from when the output from the aforementioned light-receiving means 34 exceeds a third threshold level, generated by a third level setting means, until the output from the light-receiving means 34 falls below the third threshold level, this occurring at a time when a clear area having at least a predetermined width and being formed at each opposite end of the bar code has been detected; and determining means for determining, on the basis of the outputs from the first counting means 37 and the second counting means, whether or not the clear area has been detected.

This determining means may comprise: dividing means for dividing the output from the second counting means by the output from the first counting means 37; and comparing means for outputting a clear area detection signal representing that a clear area has been detected when an output from the dividing means is not less than a predetermined value.

If the beam of light 32 from the projecting means 31 is made to undergo scanning manually or automatically an area which includes the object 33 to be scanned, the output from the light-receiving means 34 rises from a small value to a large value at a time when the beam spot moves from, for instance, a black area 38 (indicated by slanting lines in FIG. 1) on the surface of the object 33 to a high luminance white area 39. Also, at the time when the scanning position of the beam of light 32 moves from a position where the object to be scanned 33 is not present, i.e., where there is no reflected light, to the high-luminance area of the object to be scanned 33, the output from the light-receiving means changes in a similar manner. Since the beam diameter of the beam of light 32 is substantially fixed, the greater the scan velocity, the steeper the rise in the output from the light-receiving means 34. Accordingly, the time required for the light-receiving means 34 to rise is inversely proportional to the scan velocity.

The counting means 37 counts the time duration from when the output signal from the delay means 35, for delaying the output from the light-receiving means 34 by a predetermined delay time, exceeds the second threshold level TH2 until that output signal of the delay means 35 reaches the first threshold level TH1 (TH1 > TH2). As a result, the aforementioned rise time is detected. Since this rise time is inversely proportional to the scan velocity as described above, the output from the counting means 37 can be used as scan velocity information.

The reason why the output from the light-receiving means 34 is delayed by the delay means 35 is that, before the output from the light-receiving means 34 rises, it is impossible to estimate the reach level (plateau) of the output of the light-receiving means 34 after its rise. That is, after an appropriate first threshold level TM1, corresponding to the reach level, is set by delaying the signal by means of the delay means 35, the aforementioned rise time can be counted on the basis of this threshold level TH1.

If the first threshold level TH1 is obtained by dividing the potential of the output from the light-receiving means 34 by a predetermined potential-dividing ratio, it is possible to allow the counting means 37 to count the time required for the output from the light-receiving means 34 to rise up to a value which is at a fixed ratio with respect to that reach level. Hence, even if the reach level of the light-receiving means 34 is not fixed, it is possible to properly evaluate the rise time of the output from the light-receiving means 34, thereby making it possible to accurately determine the scan velocity.

If the above-described scan velocity detector is applied to a code reader for optically reading a code such as a bar code, it is possible to satisfactorily extract a signal corresponding to the code from among the output signals of the light-receiving means 34. In addition, discrimination processing of a code can also be effected satisfactorily by taking the scan velocity into consideration.

In a case where the so-called clear area provided at each opposite end of the bar code is detected in the bar code reader, the scanning time for the clear area can be obtained by the second counting means counting the time duration from when the output from the delay means 35 reaches the third threshold value until the output from the delay means 35 falls below that threshold level. If the scanning time for the clear area is divided by the output from the counting means 37, which is inversely proportional to the scan velocity, by means of, for instance, the dividing means, the width of the clear area can be detected correctly irrespective of the scan velocity. As a result, it is possible to ensure the accuracy of the extraction processing of the bar code by satisfactorily detecting the clear area, which contributes to the improvement of the reading speed.

Figure 2:
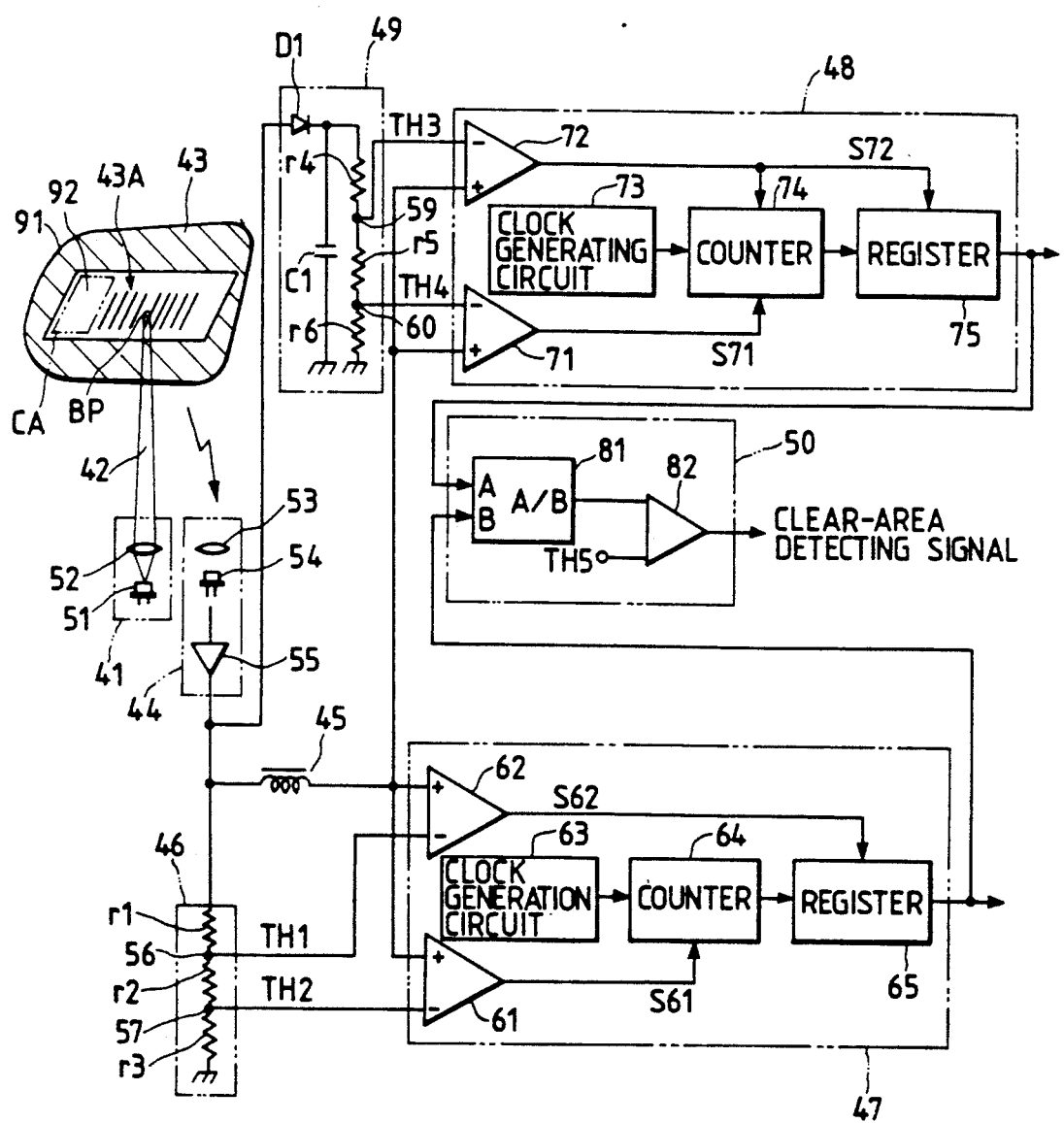
FIG. 2 is a block diagram illustrating a basic configuration of a bar code reader which is a code reader to which the scan velocity detector in accordance with the embodiment of the present invention is applied.

FIG. 2 is a block diagram illustrating an electrical configuration of essential portions of a bar code reader to which a scan velocity detector, in accordance with a first embodiment of the present invention, is applied.

This bar code reader is arranged such that a bar code 43A formed on a code surface 43, i.e., an object to be scanned, is scanned with a laser beam 42 from a light-projecting unit 41. The light reflected from the code surface during scanning is received by a light-receiving unit 44, and information represented by the bar code 43A is reproduced on the basis of an output of the light-receiving unit 44. The light-projecting unit 41 has a semiconductor laser light source 51 and a lens 52 for collimating the laser light produced by the semiconductor light source 51 into a beam of light. The scanning of the code surface 43 with the laser beam 42 may be effected manually in such a manner that the operator holds a casing accommodating the light-projecting unit 41 and the like and moves the casing. Alternatively, scanning may be effected automatically by using a scanning mirror such as a polygon mirror or a galvanometer mirror. Meanwhile, in the light-receiving unit 44, the lens 53 introduces the reflected light from the code surface 43 to a photodiode 54, amplifies an electrical signal from this photodiode 54 by means of an amplifier 55, and outputs the same.

The output signal of the light-receiving unit 44 is input to a first counting unit 47 via an analog delay line 45, and is also input to a first threshold-level generating unit 46 for forming a first threshold level TH1 and a second threshold level TH2. This threshold-level generating unit 46 divides the potential of the output signal of the light-receiving unit 44 at a predetermined potential-dividing ratio by means of resistors r1, r2, and r3 so as to derive potentials appearing at potential-dividing points 56, 57 as the first threshold level TH1 and the second threshold level TH2 (TH1 > TH2), and serve as a first level setting means and a second level setting means, respectively.

The counting unit 47 has a pair of comparators 61 and 62 to which an output of the analog delay line 45 is imparted to their noninverting inputs. Then, the second threshold level TH2 is imparted to an inverting input terminal of the comparator 61, and the first threshold level TH1 is imparted to an inverting input terminal of the comparator 62. The counting unit 47 further has a clock generating circuit 63 for forming a clock signal, a counter 64 for counting the clock signal from this clock generating circuit 63, and a register 65 for latching the count value of the counter 64 in synchronism with a rise of the output signal from the comparator 62. When a low-level signal is imparted to the counter 64 from the comparator 61, the counter 64 is cleared and counting is prohibited. The counter 64 starts its counting operation when the output level of the comparator 61 becomes high.

The output from the light-receiving unit 44 is also imparted to a second threshold-level generating unit 49 for generating third and fourth threshold levels TH3, TH4 (TH3 > TH4) to be imparted to a second counting unit 48. This second threshold-level generating unit 49 divides the potential of the output signal from the light-receiving unit 44, imparted thereto via a diode D1 and held by a capacitor C1, at a predetermined potential-dividing ratio means of resistors r4, r5, r6 so as to derive potentials appearing at potential-dividing points 59, 60 as the third and fourth threshold levels TH3, TH4, respectively, and serves as a peak hold circuit. In this embodiment, this second threshold-level generating unit 49 functions as a third level setting means. It should be noted that a buffer amplifier may be interposed between the light-receiving unit 44 and the second threshold-level generating unit 49.

The fourth and third threshold levels TH4, TH3 are respectively imparted to inverting input terminals of comparators 71, 72 constituting the second counting unit 48. An output from the analog delay line 45 is imparted to noninverting input terminals of these comparators 71, 72. The second counting unit 48 further has a clock generating circuit 73, a counter 74 for counting the clock signal from this clock generator 73, and a register 75 for latching the count value of this counter 74 with a falling edge of the output signal from the comparator 72. When the output from the comparator 71 is at a low level, the counter 74 is cleared and its count value is forcedly set to 0 and when the output from the comparator 72 is at the low level, its counting operation is prohibited and the change of its count value is prohibited. Then, when the output from the comparator 71 is at a high level, the counter 74 is allowed to assume a count value other than 0, and when the output from the comparator 72 is set to the high level, the counter 74 is allowed to effect its counting operation.

The outputs from the first and second counting units 47, 48 are inputted to a determination unit 50. This determination unit 50 has a division circuit 81 for dividing the output from the second counting unit 48 by the output from the first counting unit 47, and a comparator 82 for comparing the output from this division circuit 81 with a predetermined value TH5 and outputting a clear-area detecting signal when the output from the division circuit 81 is at least the predetermined value TH5.

Figure 3A:
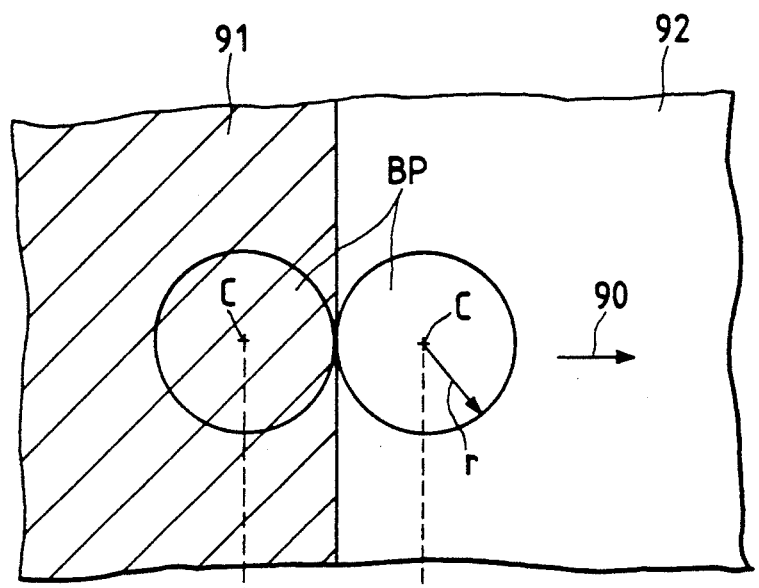
FIGS. 3a–b is a diagram explaining the basic principle of detection of the scan velocity.
Figure 3B:
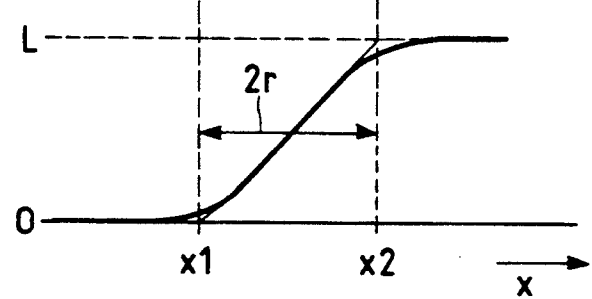

FIG. 3 is a diagram illustrating the basic principle of detection of the scan velocity, in which FIG. 3(a) shows a beam spot formed on the code surface 43, and FIG. 3(b) shows changes in the output signal from the light-receiving unit 44 with respect to the position of a center C of the beam spot. When a beam spot BP is displaced in the direction of arrow 90 and moves from a black area 91 (indicated by slanting lines) to a white area 92, the output signal from the light-receiving unit 44 rises from a 0 level to a reach level L. That is, when the center C of the beam spot BP is to the side of a coordinate position 1 opposite to the direction of scanning, the laser beam is absorbed in the black area 91, so that the output from the light-receiving unit 44 is set to the 0 level. When the center C of the beam spot BP passes the coordinate position x1, part of the beam spot BP partly overlaps with the white area 92, so that the amount of light received by the light-receiving unit 44 gradually increases. Then, at a coordinate position x2 (x2 = x1 + 2r), which is displaced by a radius r of the beam spot in the direction of arrow 90 from a boundary between the black area 91 and the white area 92, the amount of light received becomes maximum, and the output of the light-receiving unit 44 reaches the reach level L. The amount of light received by the light-receiving unit 44 is determined by the power of the beam, the reflectivity of the white area 92, and the distance between the code surface 43 and the light-projecting unit 41, and the like. Since the power density distribution of the laser beam conforms to a Gaussian distribution, the power is also distributed, though slightly, outside the radius r of the beam spot. For this reason, changes in the output from the light-receiving unit 44 are not rectilinear, and depict curves slightly rounded in the vicinity of the coordinate positions x1 and x2.

Since the distance between the coordinate positions x1 and x2 is equal to a diameter 2r of the beam spot BP, if a time Δt, during which the output signal from the light-receiving unit 44 reaches the reach level L from the 0 level, can be ascertained, the scan velocity V can be given by the following formula:

$$V = 2r/\Delta t \qquad (2)$$

By detecting the aforementioned time Δt, it is possible to obtain the scan velocity V inversely proportional to the time Δt. In other words, it can be said that the time Δt is scan velocity information.

FIG. 4 is a timing chart explaining the operation of the configuration shown in FIG. 2. FIG. 4(a) shows the output of the light-receiving unit 44, the output of the analog delay line 45, and the like; FIG. 4(b) shows an output signal S61 from the comparator 61 in the first counting unit 47; FIG. 4(c) shows an output signal S62 from the comparator 62; FIG. 4(d) shows an output signal S71 from the comparator 71 in the second counting unit 48; and FIG. 4(e) shows an output signal S72 from the comparator 72. It should be noted that FIG. 4 shows the operation in a case where a clear area CA formed on the side of the bar code 43A opposite the direction of scanning is detected.

When the beam spot BP is displaced from the black area 91 toward the white area 92 constituting the clear area CA, at the time when the beam spot BP moves through the boundary between the areas 91 and 92, the output signal from the light-receiving unit 44 indicated at a curve A1 in FIG. 4(a) rises as shown at reference character a1. Then, the output from the analog delay line 45 indicated at a curve A2 in FIG. 4(a) shows a change similar to the output from the light-receiving unit 44 as indicated at reference character a2, by delaying by a predetermined delay time Td. The first to fourth threshold levels TH1 - TH4 are generated by dividing the potential of the output signal from the light-receiving unit 44, so that these threshold levels TH1 - TH4 rise in synchronism with the rise of the output signal from the light receiving unit 44. The delay time Td is selected in such a manner as to be provided with a sufficient length so as to allow the output signal from the light-receiving unit 44 to reach the reach level L.

Figure 5:
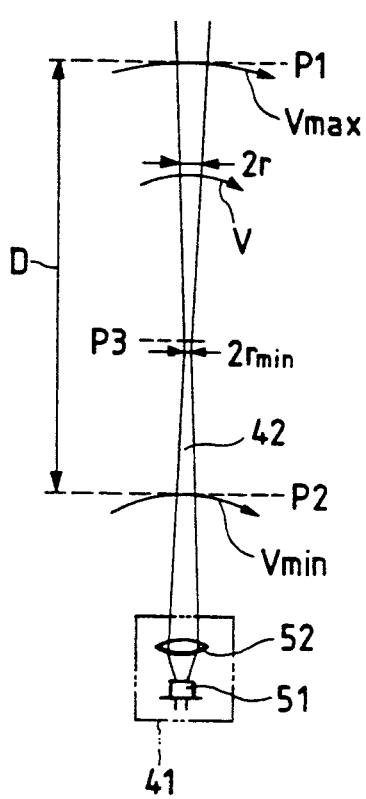
FIG. 5 is a diagram explaining condensing characteristics of a laser beam from a light projector and the change in scan velocity based on a read position.
Figure 6:
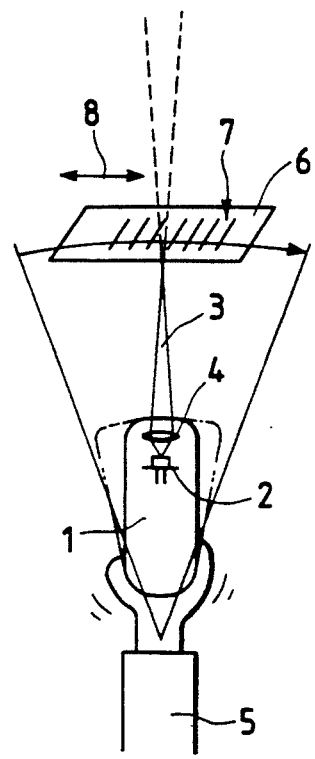
FIG. 6 is a simplified plan view illustrating the operation of bar code reading using a bar code reader of a manual scanning type.
Figure 7:
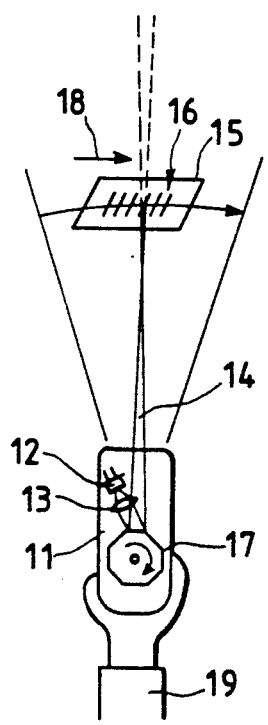
FIG. 7 is a simplified plan view illustrating the operation of bar code reading using a bar code reader of an automatic scanning type.

For instance, if a bar code reading is effected within a read range D as shown in FIG. 5, when employing automatic scanning using a polygon mirror or the like, the scan velocity V assumes a maximum value $V_{max}$ at a position P1 which is a maximum read distance, and it assumes a minimum value $V_{min}$ at a position P2 which is a minimum read distance. Accordingly, the time duration from when the output signal of the light-receiving unit 44 rises from the 0 level until it reaches the reach level L becomes longest in the case of the position P2 at the minimum read distance. In this case in which the read distance is minimum, if it is assumed that the time during which the output signal from the light-receiving unit 44 rises from the 0 level to the reach level L is $t_{max}$, the condition required for the aforementioned delay time Td is expressed as $$Td \geq \Delta t_{max} = (2r/V)_{max} \qquad (3)$$

This condition imposed on the delay time Td may, for example, be set as follows:

$$Td \geq \Delta t_{max} + M1 = (2r/V)_{max} + M1 \qquad (4)$$

where M1 is a margin, and M1 > 0. The margin M1 is determined by taking into consideration factors such as the fact that the power density outside the beam radius r is not 0 since the power density distribution of the laser beam conforms to the Gaussian distribution and the fact that the scan velocity during one scanning is not necessarily fixed in cases where the optical path length of the laser beam varies depending on a scanning position due to the code surface 43 being inclined, in cases where a galvanometer mirror is Used, in the case of manual scanning, and in other similar cases.

It should be noted that although in manual scanning no fixed relationship exists between the scan velocity V and the read distance, it suffices if the aforementioned maximum value $V_{max}$ and the minimum value $V_{min}$ are determined on the basis of restrictions imposed by the processing speed in bar code discrimination processing.

Referring again to FIG. 4, a description will be given of the operation. When the output signal from the analog delay line 45, shown at the curve A2 in FIG. 4(a), exceeds the second threshold level TH2 at a time t1, the output from the comparator 61 is inverted from the low level to the high level. The counter 64 starts the counting of the clock signal at a period from the time t1. Then, when the output signal from the analog delay line 45 reaches the first threshold level TH1 at a time t2, the output from the comparator 62 rises from the low level to the high level, and the count value of the counter 64 is latched by the register 65 in synchronism with this rise. The count value latched by the register 65 at this time corresponds to a time Δta from the time t1 until the time t2. For instance, where the resistance values of the resistors r1 - r3 in the threshold-level generating unit 46 are set in such a manner that the threshold levels TH1 and TH2 become as follows:

$$TH1 = m1 \cdot L \qquad (5)$$

$$TH2 = m2 \cdot L \qquad (6)$$

where 0 < m2 < m1 < 1, then the aforementioned time Δt (see FIG. 3) required for the beam spot BP to move from the black area 91 to the clear area CA can be obtained from the following relational expression:

$$\Delta t_a = (m1 - m2) \cdot \Delta t \qquad (7)$$

The reason why Δt is thus not directly detected and Δta is detected is that the power distribution of the laser beam conforms to the Gaussian distribution as described above. This causes curves as shown by reference characters a3 and a4 to occur in the changes of the output signal from the analog delay line 45. Therefore, if an attempt is made to directly measure Δt, the accuracy of time measurement can deteriorate.

At a time t3 at which the output signal from the analog delay line 45 exceeds the fourth threshold level TH4, which is set to be slightly higher than the second threshold level TH2 through the selection of the resistance values of the resistors r4 - r6, the output from the comparator 71 is inverted from the low level to the high level. This allows the counter 74 to assume a count value other than 0. At this time, however, since the output from the comparator 72 is still at the low level, the counter 74 is still prohibited from effecting its counting operation.

At a time t4 at which the output from the analog delay line 45 reaches the third threshold level TH3, which is set to be slightly lower than the first threshold level TH1, the output from the comparator 72 is inverted from the low level to the high level. Accordingly, the counter 74 starts the counting of the clock signal during the time starting from the time t4.

Subsequently, during the time when the clear area CA is being scanned, the output from the light-receiving unit 44 is stabilized at the reach level L, as shown at reference character a5. Then, when the scanning of the bar code 43A is commenced during the time starting from a time t5, the output from the light-receiving unit 44 falls as shown at reference character a6.

During the length of the aforementioned delay time Td after a time t6, the output signal of the analog delay line 45 falls, as shown at reference character a7. In the second threshold-level generating unit 48, however, an input of the declining output signal of the light-receiving unit 44 is prevented by the diode D1, and the output signal from the light-receiving unit 44 is held by the capacitor C1 during the time prior to the time t5. Consequently, even after the output from the light-receiving unit 44 falls, the threshold levels TH3 and TH4 do not fall immediately, but fall gradually with a time constant, determined by the sum of the electrostatic capacity of the capacitor C1 and the resistance values of the resistors r4 - r6. Accordingly, sufficiently high values are maintained for TH3 and TH4 after time t6 when the output signal from the analog delay line 45 begins to fall.

When the output from the analog delay line 45 falls below the third threshold level TH3 at a time t7, the output from the comparator 72 falls from the high level to the low level. The count value of the counter 74 is latched by the register 75 in response to the same, and the counting operation of the analog delay line 45 is prohibited. Furthermore, the output from the analog delay line 45 falls below the fourth threshold level TH4 at a time t8, resulting in the output from the comparator 71 being inverted to the low level, clearing the counter 74.

The count value of the counter 74 latched by the register 75 corresponds to a length of period $\Delta T$ from the time t4 until the time t7 during which the output from the light-receiving unit 44 is relatively high. That is, the time from the t4 until t7 is a time when the amount of light reflected from code surface 43 is great, and if such a length of period $\Delta T$ is not less than a predetermined value, it can be considered that the clear area CA at the leading end of the bar code 43A was scanned during that time.

The output from the register 75 is input to the divider 81 of the determination unit 50, and the value obtained by dividing the output of the register 75 by the output of the register 65 of the first counting unit 47 is compared with the predetermined value TH5 by the comparator 82. When the output from the divider 81 is at least the predetermined value TH5, a clear area detection signal representing that the clear area has been detected is output from the comparator 82.

The width A of the clear area CA is given by the velocity V and the aforementioned time $\Delta T$ required for scanning the clear area CA as follows:

$$V \cdot \Delta T = A \tag{8}$$

meanwhile, $$-V \cdot \Delta t = V \cdot \Delta t a / (m1 - m2) = 2r \tag{9}$$

Since the output from the register 65 of the first counting unit 47 corresponds to the time $\Delta t$, and the output from the register 75 of the second counting unit 48 corresponds to the time $\Delta T$, the output from the divider 81 corresponds to $$\Delta T/\Delta t = A/2r \tag{10}$$

Since the beam diameter 2r of the laser beam 42 is substantially fixed, the output from the divider 81 substantially accurately corresponds to the width A of the clear area CA evaluated by removing the scan velocity V. Accordingly, the comparator 82 outputs the clear area detection signal when the width of the white area is not less than the predetermined value TH5.

This clear area detection signal is imparted to an unillustrated discrimination processing unit, and this discrimination processing unit effects the discrimination processing of the bar code 43A by regarding that a signal following the signal corresponding to the clear area CA is a signal corresponding to the bar code 43A.

The laser beam 42 emitting from the light-projecting unit 41 is converging light having a focal point at a position P3 at a fixed distance from the light-projecting unit 41 so as to obtain a very small beam diameter. Accordingly, the beam diameter 2r of the laser beam 42 assumes different values depending on the read position. For this reason, in this embodiment, from a beam radius $r_{min}$ at the focal position and a beam radius $r_{max}$, which is the larger one of the beam radii at the respective ends of the read range D, an average value $r_{av}$ of the beam radius within the read range D is obtained:

$$r_{av}^{-1} = (r_{min}^{-1} + r_{max}^{-1})/2 \tag{11}$$

The predetermined value TH5 in the comparator 82 is determined on the basis of this average value $r_{av}$ of the beam radius.

If it is assumed that the scan velocity V is determined on the basis of the average value $r_{av}$ of the beam radius as $$V = 2r_{av}/\Delta t \tag{12}$$

the error of the scan velocity V occurring due to the fact that the beam diameter 2r varies depending on the read position is given as $$|\delta| \leq (r_{max} - r_{av})/r_{max} = (r_{av} - r_{min})/r_{min} \tag{13}$$

Meanwhile, if the ratio between the minimum beam radius $r_{min}$ and the maximum beam radius $r_{max}$ is adjusted to approximately 1:2 by adjusting the light projecting unit, the following formula is obtained:

$$r_{av}^{-1} = (r_{min}^{-1} + r_{max}^{-1})/2 = \tfrac{3}{4} \cdot r_{min}^{-1} = 3/2 \cdot r_{max}^{-1} \tag{14}$$

From this formula, the following formula is derived:

$$|\delta| \leq (r_{max} - r_{av})/r_{max} = \tfrac{1}{3} \tag{15}$$

That is, the scan velocity obtained indirectly by detecting the time $\Delta t$ only contains an error of $\tfrac{1}{3}$ thereof at most. Thus, since the scan velocity is detected with a small degree of error, it is unnecessary to allow for an excessively large margin for the aforementioned predetermined value TH5, so that the probability of detection of the clear area CA becomes extremely high. In contrast, with the above-described prior art in which the scan velocity is not detected at all, it is necessary to allow for a large margin of the value of TH5 to detect a clear area as the respective values of scan velocity can vary 10-fold or thereabouts depending on a read position. The probability of detection of the clear area cannot be increased due to this large margin. According to this embodiment, it can be appreciated that the probability of detection of the clear area can be improved remarkably.

The probability of detection of the clear area can thus be improved, so that a signal corresponding to the bar code can be extracted reliably. Hence, it is possible to prevent bar code discrimination processing from being effected wastefully with respect to the signal corresponding to portions other than the bar code in the final analysis and the bar code reading speed and the reading reliability can be improved remarkably. Moreover, since a memory for storing all the output signals from the light-receiving unit 44 during one scanning period is not used, a complicated circuit such as a memory processing circuit is not required. The circuitry is prevented from becoming large in size and complicated, and an increase in cost is not entailed.

The present invention is not restricted to the above-described embodiment. For instance, although in the above-described embodiment an example has been cited in which the detected scan velocity information is used to detect a clear area at an end of the bar code, the detected scan velocity information may be used for the bar code discrimination processing. The discrimination of the bar code is effected by, for example, a combination of relative bar widths and space widths using an initial bar width as a reference. Accordingly, even if the velocity at which the bar code is scanned is not determined, bar code discrimination processing is possible. In reality, however, since the characteristics of analog input signals (the pulse time width, the speed of change between white and black areas, etc.) from the light-receiving unit differ greatly depending on the scan velocity, stable binarization processing is difficult, which often leads to errors in discrimination. Accordingly, if the discrimination processing is effected by taking the scan velocity into account, it is possible to greatly improve the discrimination accuracy by effecting binarization processing and the like by incorporating correction with respect to the scan velocity.

In addition, although in the above-described embodiment the analog delay line is used as the delay means, the delay means may be arranged by using a FIFO (first-in first-out) memory.

Furthermore, although in the above-described embodiment a description has been given by citing the bar code reader as an example, the present invention can be implemented extensively with respect to other code readers such as optical character readers (OCRs).

Various other design changes are possible without departing from the spirit of the invention.

As described above, in accordance with the scan velocity detector, as in a case where the position of scanning with a beam of light moves from a low-luminance area of the surface of an object to be scanned to a high-luminance area thereof, or as in a case where the scanning position moves from an area which is outside the object to be scanned and where there is no reflected light to an area of the surface of the object to be scanned, at a time when the output from the light-receiving means for receiving the aforementioned reflected light rises, the detection of scan velocity information can be attained by counting the rise time.

In the code reader using the scan velocity detector, by taking the scan velocity into consideration, it is possible to effect processing for extracting a signal corresponding to a code from an output signal from the light-receiving means and processing for discriminating the code on the basis of the extracted signal. As a result, the extraction of codes can be effected at a high probability, and the discrimination processing of codes can be effected accurately, so that reliable reading of codes can be ensured. Furthermore, since a memory for storing the outputs from the light-receiving means during one scanning period or a complicated circuit such as a memory processing circuit are not used, the arrangement does not become large in size, complicated or costly.

What is claimed is:

1. A scan velocity detector for detecting scan velocity when a surface of an object to be scanned is scanned with a beam of light, comprising:
   lighting-receiving means for receiving light reflected from said surface of said object to be scanned and for converting said light reflected into an electrical signal;
   first level setting means for setting a first threshold level using an output signal from said light receiving means as a reference;
   second level setting means for setting a second threshold level relatively lower than said first threshold level;
   delay means for delaying said output signal from said light-receiving means by a predetermined delay time; and
   first counting means for counting a time duration from when a delay output signal from said delay means exceeds said second threshold level until said delay output signal of said delay means reaches said first threshold level, the time counted providing an indication of scan velocity;
   third level setting means for setting a third threshold level;
   second counting means for counting a length of a time from when said delay output signal from said delay means exceeds said third threshold level until said delay output signal from said delay means falls below said third threshold level and for outputting a second counting output; and
   determining means for determining from said first counting output from said first counting means and a said second counting output from said second counting means whether or not a clear area has been scanned.

2. A code reader according to claim 1, wherein said determining means comprises:
   dividing means for dividing said second counting output from said second counting means by said first counting output from said first counting means; and
   comparing means for outputting a clear area detection signal representing that said clear area has been detected when a dividing output from said dividing means is not less than a predetermined value.

3. A scan velocity detector for detecting scan velocity when a surface of an object to be scanned is scanned with a beam of light, comprising:
   lighting-receiving means for receiving light reflected from said surface of said object to be scanned and for converting said light reflected into an electrical signal;
   first level setting means for setting a first threshold level using an output signal from said light receiving means as a reference;
   second level setting means for setting a second threshold level relatively lower than said first threshold level;
   an analog delay line for delaying said output signal from said light-receiving means by a predetermined delay time; and
   first counting means for counting a time duration from when a delay output signal from said delay means exceeds said second threshold level until said delay output signal of said delay means reaches said first threshold level, the time counted providing an indication of scan velocity.

4. A scan velocity detector for detecting scan velocity when a surface of an object to be scanned is scanned with a beam of light, comprising:
   lighting-receiving means for receiving light reflected from said surface of said object to be scanned and for converting said light reflected into an electrical signal;
   first level setting means for setting a first threshold level using an output signal from said light receiving means as a reference;
   second level setting means for setting a second threshold level relatively lower than said first threshold level;
   a FIFO for delaying said output signal from said light-receiving means by a predetermined delay time; and
   first counting means for counting a time duration from when a delay output signal from said delay means exceeds said second threshold level until said delay output signal of said delay means reaches said first threshold level, the time counted providing an indication of scan velocity.

5. A code reader for reading a bar code on a surface of an object having a clear area with a predetermined width at opposite ends thereof scanned with a beam of light, comprising:

lighting-receiving means for receiving light reflected from said surface of said object to be scanned and for converting said light reflected into an electrical signal and for outputting an output signal;

first level setting means for setting a first threshold level using said output signal as a reference;

second level setting means for setting a second threshold level relatively lower than said first threshold level using said output signal;

delay means for delaying said output signal from said light receiving means by a predetermined delay time and for outputting a delay output signal;

first counting means for counting a time duration from when said delay output signal exceeds said second threshold level until said delay output signal reaches said first threshold level, said time counted providing an indication of scan velocity, and for outputting a first counting output;

third level setting means for setting a third threshold level;

second counting means for counting a length of a time from when said delay output signal exceeds said third threshold level until said delay output signal falls below said third threshold level and for outputting a second counting output; and determining means for determining from said first counting output and said second counting output whether or not a clear area has been scanned.

6. A code reader according to claim 5, wherein said determining means comprises:

dividing means for dividing said second counting output from said second counting means by said first counting output and for outputting a dividing output; and comparing means for outputting a clear area detection signal representing that said clear area has been detected when said dividing output is not less than a predetermined value.

7. A code reader according to claim 5, wherein said delay means is an analog delay line.

8. A code reader according to claim 5, wherein said delay means is a FIFO.

9. A code reader according to claim 5, further comprising a buffer amplifier interposed between said light-receiving means and said third level setting means.

* * * * *